US009304632B2

(12) United States Patent
Xie et al.

(10) Patent No.: US 9,304,632 B2
(45) Date of Patent: Apr. 5, 2016

(54) TOUCH PANEL AND MANUFACTURING METHOD THEREOF

(75) Inventors: Yanjun Xie, Wuhan (CN); Yau-Chen Jiang, Zhubei (TW); Bin Lai, Fuzhou (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 30 days.

(21) Appl. No.: 13/436,983

(22) Filed: Apr. 1, 2012

(65) Prior Publication Data
US 2013/0050107 A1 Feb. 28, 2013

(51) Int. Cl.
*G06F 3/044* (2006.01)

(52) U.S. Cl.
CPC ...... *G06F 3/044* (2013.01); *G06F 2203/04103* (2013.01); *G06F 2203/04111* (2013.01)

(58) Field of Classification Search
CPC ............. G06F 2203/04111; G06F 2203/04103
USPC ................................................. 345/173–183
See application file for complete search history.

(56) References Cited

U.S. PATENT DOCUMENTS

| 8,471,151 B2* | 6/2013 | Fan ......................... G06F 3/044 174/254 |
| 2008/0087888 A1* | 4/2008 | Morisue .............. H01L 51/0529 257/40 |
| 2010/0171718 A1* | 7/2010 | Denda ........................... 345/173 |
| 2010/0261119 A1* | 10/2010 | Li et al. ......................... 430/319 |
| 2011/0193801 A1* | 8/2011 | Jung et al. ..................... 345/173 |
| 2012/0032898 A1* | 2/2012 | Li et al. ........................ 345/173 |
| 2012/0062486 A1* | 3/2012 | Rho .............................. 345/173 |
| 2012/0118613 A1* | 5/2012 | Fan ............................... 174/250 |
| 2013/0168138 A1* | 7/2013 | Yamazaki ............ H05K 1/0296 174/253 |

FOREIGN PATENT DOCUMENTS

| CN | 101241919 | 8/2008 |
| CN | 101706702 A | 5/2010 |
| CN | 201570004 U | 9/2010 |
| JP | 10337524 | 12/1998 |
| JP | 2011065515 | 3/2011 |
| JP | 2011150550 | 8/2011 |
| TW | M342558 | 10/2008 |
| TW | M371271 | 12/2009 |
| WO | WO2010150668 | 10/2010 |

* cited by examiner

*Primary Examiner* — Gene W Lee
(74) *Attorney, Agent, or Firm* — Gokalp Bayramoglu

(57) ABSTRACT

The present disclosure provides a manufacturing method of a touch panel that comprises of: simultaneously baking a sensing electrode layer and a protective layer that covers the sensing electrode layer. The present disclosure solves the issue of the sensing electrode layer being easily oxidized or corroded when baked alone. The present disclosure also simplifies the manufacturing process of the touch panel. The present disclosure also provides a touch panel on the basis of the manufacturing method.

17 Claims, 6 Drawing Sheets

TOUCH PANEL AND MANUFACTURING METHOD THEREOF

This Application claims priority to China Patent Application No. 201110271114.6 filed on Aug. 26, 2011.

BACKGROUND OF THE INVENTION

1. Field of the Invention

The present disclosure relates to an input device, and more specifically to a touch panel and manufacturing method thereof.

2. Description of the Related Art

Present touch panels of input devices are of different types: Resistive type, Capacitive type and Optical type, wherein capacitive touch panels have a stack-up structure that is stacked by a sensing electrode layer, an insulation layer and a conductive wire layer on a substrate, wherein the touch panel combines with a control circuit and a liquid crystal display module to be disposed in electronic devices that include a touch option.

In a conventional process, while a finger or a touch stylus touches or approaches a capacitive touch panel, electric potential signal changes at the touch position, based on which a control circuit determines coordinates of a touch position. Thus, the touch panel is normally provided with a touch region for users to touch. Meanwhile, there is a peripheral region encompassed with the touch region that is used for disposing the conductive wire layer to connect with an external control circuit.

Conventional touch panels are illustrated in the following drawings. FIG. 1 is a flow chart of a typical manufacturing method for a traditional touch panel. FIG. 2 is a section view of a traditional touch panel, and FIG. 3 is a planar bottom view of a traditional touch panel.

A manufacturing method for a traditional capacitive touch panel disclosed here, comprises the following seven steps:

At Step S1: disposing a first wire layer 200 on a transparent substrate 100, to form a plurality of bridge wires 210 in a touch region 110;

At Step S2: disposing an insulation layer 300 in the touch region 110 of the transparent substrate 100, to form a plurality of insulating bridges 310, which are equivalently overlaid on middle section of the bridge wires 210, and both ends of the bridge wire 210 are exposed outside to the insulation bridges 310;

At Step S3: disposing a sensing electrode layer 400 in the touch region 110 of the transparent substrate 100. Further, a plurality of X-axis electrodes 410 electrically isolated from each other and a plurality of Y-axis electrodes 420 electrically connecting with each other are formed in the touch region 110. The Y-axis electrodes 420 are electrically connected to each other by a connecting line 430. The connecting line 430 equivalently crosses the insulating bridge 310 and spaces the X-axis electrodes 410. The two X-axis electrodes 410 located at either side of the connecting line 430 are separately connected to one end of the bridge wire 210.

At Step S4: baking the sensing electrode layer 400 to cure the X-axis electrodes 410, the Y-axis electrodes 420, and the connecting line 430;

At Step S5: disposing a second wire layer 220 in the peripheral region 120 of the transparent substrate 100 to form a plurality of peripheral wires 230, wherein the peripheral wires 230 are electrically connected to the X-axis electrodes 410 or Y-axis electrodes 420;

At Step S6: disposing a protective layer 500 to cover the whole substrate 100 and the stack-up disposed on the substrate 100; and At Step S7: baking the protective layer 500.

According to steps S1 to S7, the protective layer 500 prevents electrodes 410, electrodes 420, and the connecting line 430 from being oxidized because of the long exposure to air, or being corroded by corrosive liquid or gas. Although the protective layer 500 can protect the sensing electrode layer 400 that has already been made, it is unable to protect the sensing electrode layer 400 from being exposed to the air during the manufacturing process. Thus, the electrodes 410, 420 and the connecting line 430 are easily oxidized by the oxide in the environment during the baking process as step S4 is executed without protective layer 500, which leads to a variation of resistance value that affects recognition capability of a system for coordinate positions of the axis.

Moreover, the second wire layer 220 is disposed after the sensing electrode layer 400 of step S4, that is the sensing electrode layer 400 is exposed to the air while the second wire layer 220 is disposed. Thus, the sensing electrode layer 400 is easily oxidized by the steam in the air, or corroded by corrosive liquid and gas. As a result, resistance value of the electrodes 410, 420 and the connecting line 430 becomes unstable.

SUMMARY OF THE INVENTION

The present disclosure provides a touch panel and manufacturing method thereof. The present disclosure solves the issue of electrode unstableness in terms of its resistance value, which is caused by a sensing electrode layer getting easily oxidized or corroded during a manufacturing process of a touch panel.

According to one embodiment of the present disclosure, a manufacturing method for a touch panel comprises a step of simultaneously baking a sensing electrode layer and a protective layer that covers the sensing electrode layer, thereby preventing the sensing electrode layer from being oxidized by air during the baking process. This step also reduces one baking process compared with respectively baking the sensing electrode layer and the protective layer.

According to one embodiment of the present disclosure, a touch panel comprises a sensing electrode layer and a protective layer that covers the sensing electrode layer, wherein the protective layer is in direct contact with the sensing electrode layer.

The present disclosure will become more apparent from the following detailed description when taken in conjunction with the accompanying drawings.

DETAILED DESCRIPTION OF THE EMBODIMENTS

In accordance with the usual meaning of "a" and "the" in patents, reference, for example, to "a" bridge wire or "the" bridge wire is inclusive of one or more bridge wires. In this application, use of the singular includes the plural and vice versa unless specifically stated otherwise, for example, a term "separate electrode" includes singular and plural forms. Section headings used herein are for organizational purposes only, and are not to be construed as limiting the subject matter described.

Detailed description of the present disclosure will be discussed in the following embodiments, which are not intended to limit the scope of the present disclosure, but still can be adapted for other applications. While drawings are illustrated in detail, it would be appreciated that quantity of the disclosed components could be greater or less than disclosed, except those components for which an explicit restricting amount has been disclosed.

Figure 1:
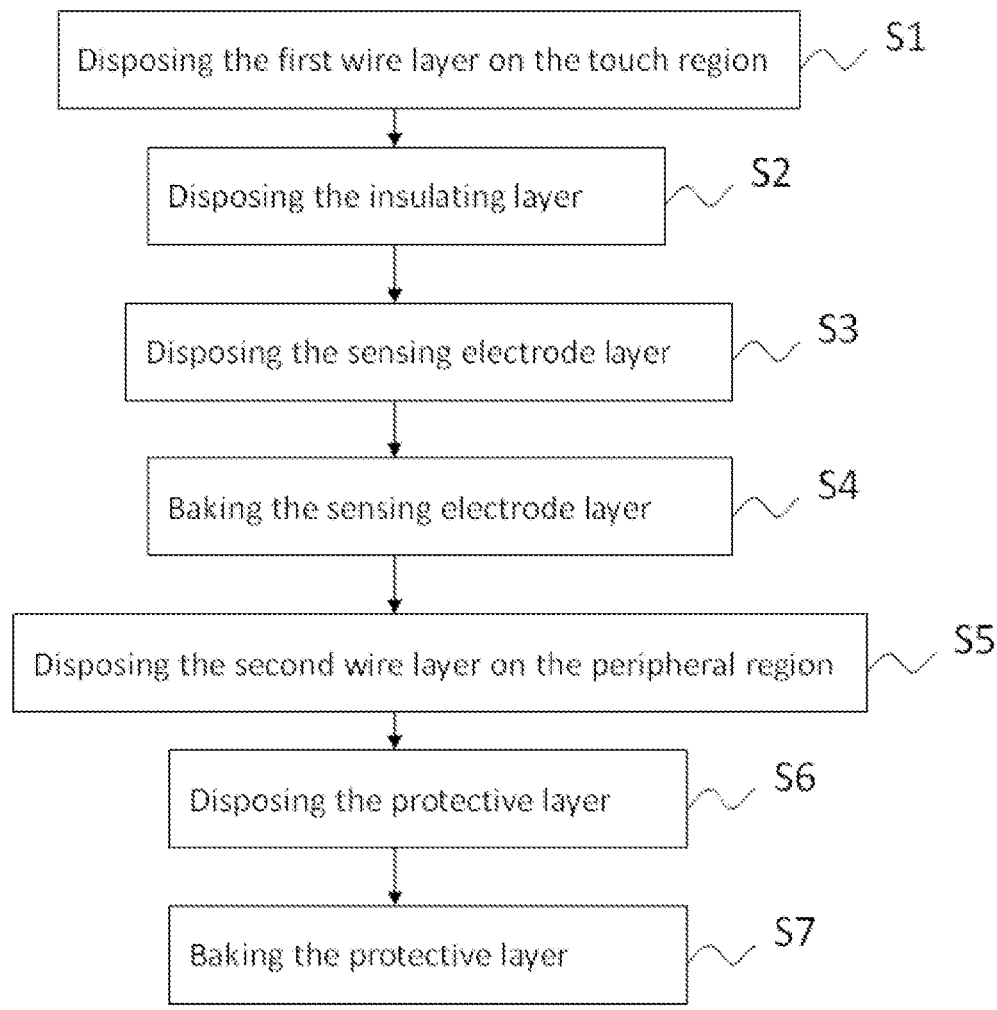
FIG. 1 is flow chart of a manufacturing method for a traditional touch panel.
Figure 2:
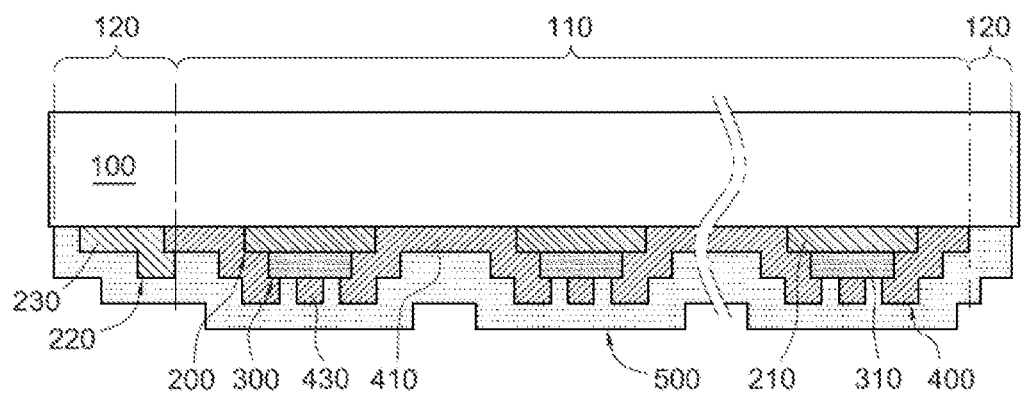
FIG. 2 is a cross-sectional schematic view of the traditional touch panel.
Figure 3:
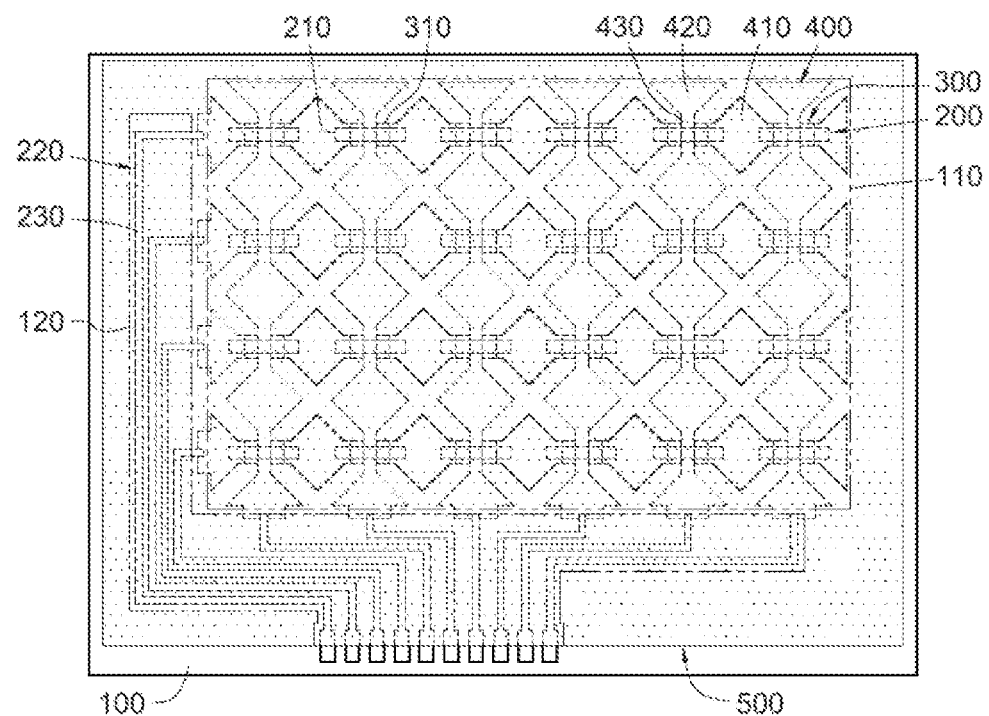
FIG. 3 is a plan bottom schematic view of the traditional touch panel.
Figure 4:
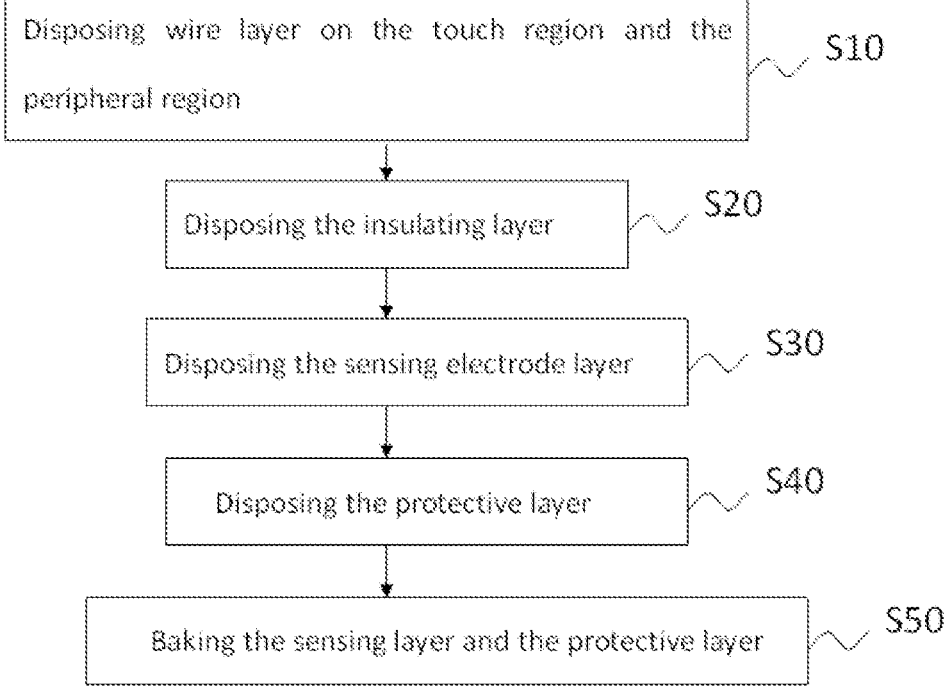
FIG. 4 is flow chart of a manufacturing method of a touch panel according to the present disclosure.
Figure 5:
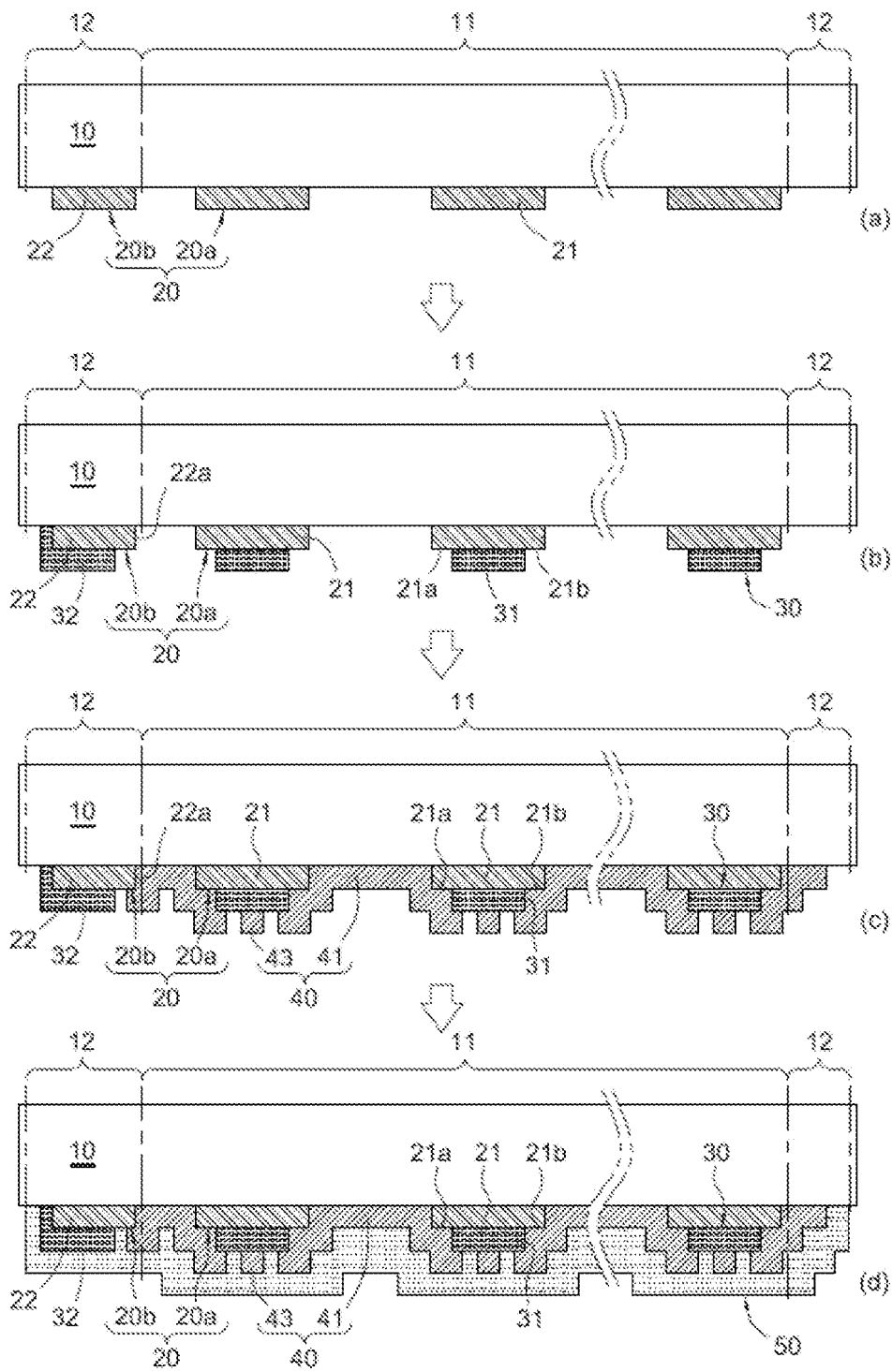
FIG. 5(a) to FIG. 5(d) are cross-sectional schematic views of disposing processes for the touch panel in correspondence with FIG. 4 according to the present disclosure.
Figure 8:
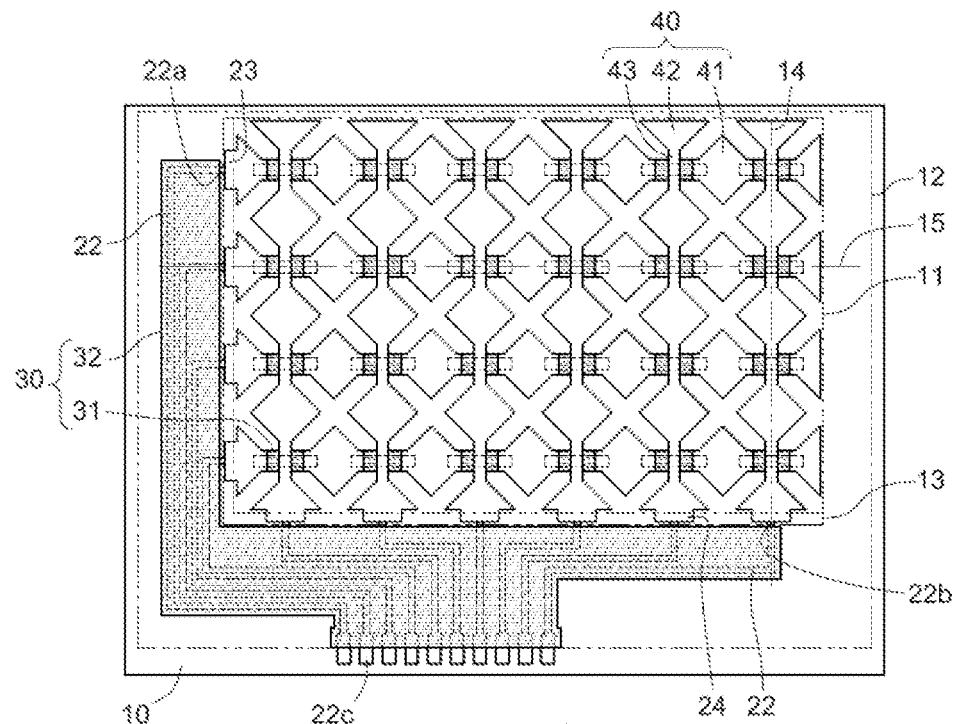
Figure 9:
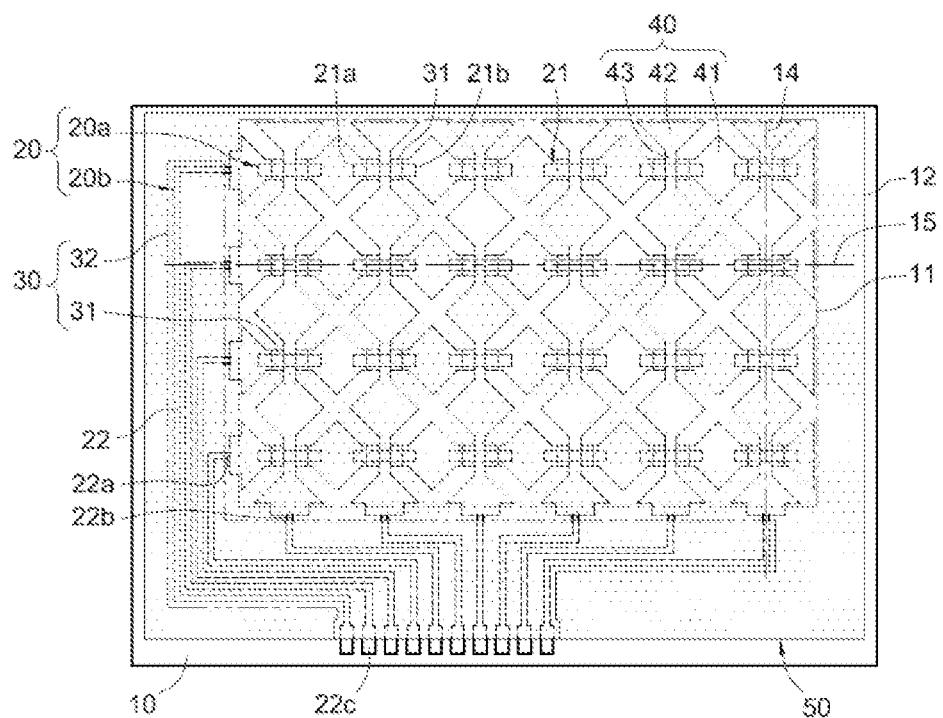
Figure 10:
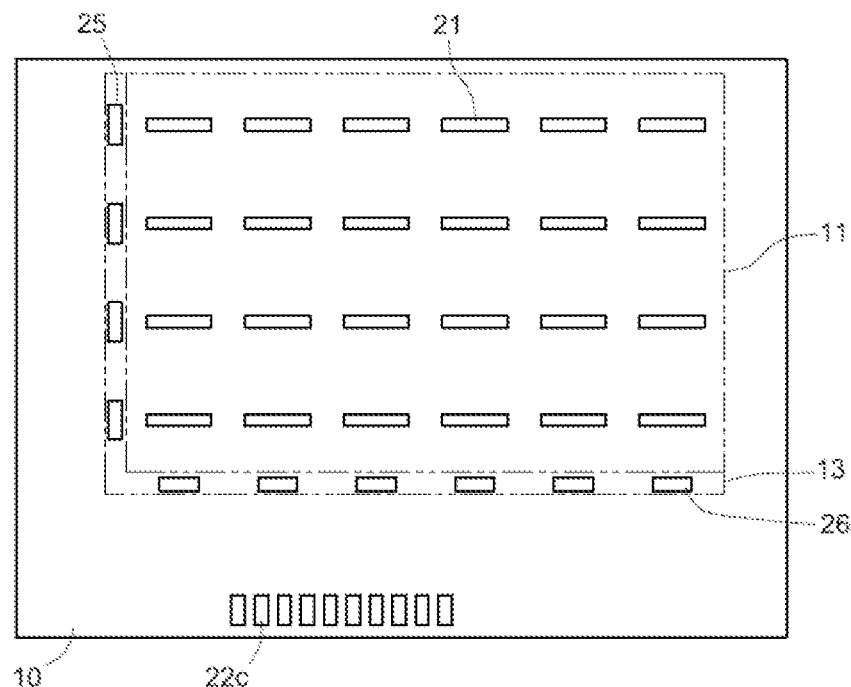
FIG. 10 is a plan bottom schematic view of a part of wire layer according another embodiment of the present disclosure.
Figure 11:
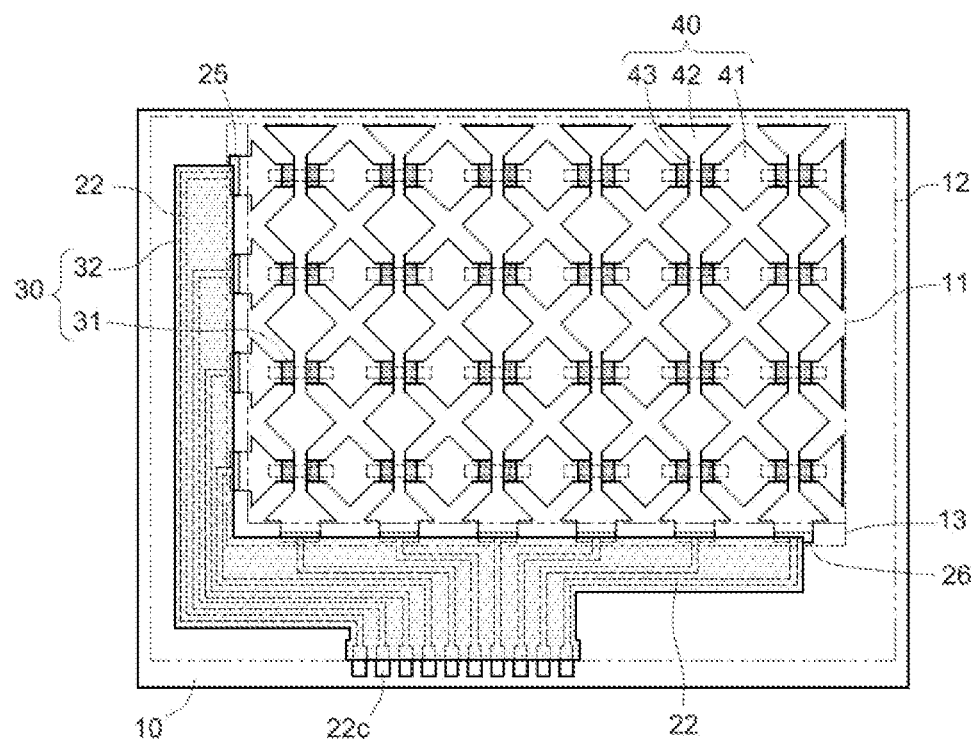
FIG. 11 is a plan bottom schematic view of another embodiment of the present disclosure.

Referring to FIG. 4 to FIG. 9, a manufacturing method for a touch panel is described according to the present disclosure; FIG. 4 illustrates a flow chart of a manufacturing method for a touch panel according to the present disclosure; FIG. 5(a) to FIG. 5(d) are cross-sectional schematic views of disposing processes for a touch panel in correspondence with FIG. 4 according to the present disclosure; FIG. 6 to FIG. 9 are plan bottom schematic views of touch panel in correspondence with FIG. 5(a) to FIG. 5(d) according to the present disclosure; FIG. 10 is a plan bottom schematic view of a part of wire layer according to another embodiment of the present disclosure; and FIG. 11 is a plan bottom schematic view of another embodiment of the present disclosure. Foregoing drawings that describe manufacturing method of a touch panel of the present disclosure comprises the step of baking a sensing electrode layer 40 and a protective layer that covers the sensing electrode layer 40 at the same time.

Figure 6:
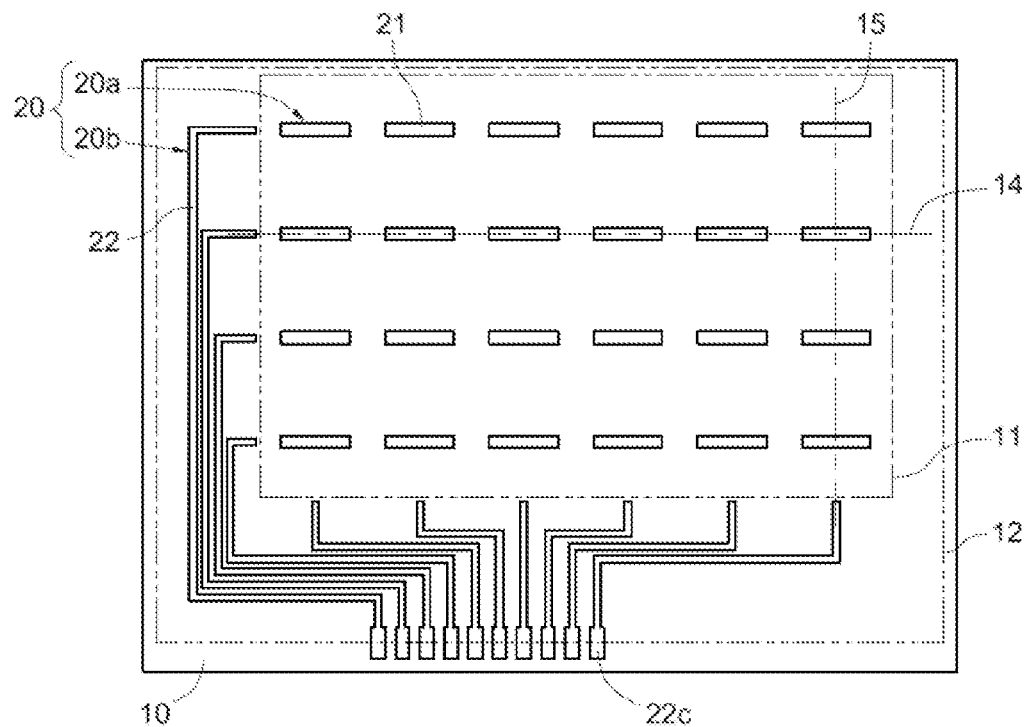
FIG. 6 to FIG. 9 are plan bottom schematic views of touch panel correspondence with FIG. 5(a) to FIG. 5(d) according to the present disclosure.

According to one embodiment of the present disclosure, a manufacturing method of a touch panel comprises of following steps: At Step S10: a good touch-feeling glass, a transparent glass, or a transparent passivation material is used for making a substrate 10. A touch region 11 and a peripheral region 12 are defined on the substrate 10. Shape of the touch region 11 can be of rectangle, loop-shaped, circle or a grid, and the peripheral region 12 surrounds the periphery of the touch region 11. A wire layer 20 is disposed (as shown in FIG. 5a and FIG. 6) in the touch region 11 and the peripheral region 12 of the substrate 10.

In particular, the wire layer 20 forms a first wire layer 20a and a second wire layer 20b, wherein the first wire layer 20a forms a plurality of bridge wires 21 that are distributed in the touch region 11, and the second wire layer 20b forms a plurality of peripheral wires 22 that are distributed in the peripheral region 12, while one end of the peripheral wire 22 forms the external terminal 22c that is adjacent to the edge of substrate 10, and is used to connect to an external soft control circuit.

According to one embodiment of the present disclosure, the wire layer 20 is made of transparent high-temperature indium tin oxide or opaque metal material (such as silver etc.). If high-temperature indium tin oxide material is selected, the method of exposure, development and etching can be used, or the method of traditional lacer etching can be used for forming bridge wires 21 and peripheral wires 22 on the substrate 10. On the other hand, if conductive materials such as silver are selected, the method of screen printing can be used for forming bridge wire 21 and peripheral wire 22. In this method, the bridge wires 21 and the peripheral wires 22 can be formed in one manufacturing process using same material.

In another embodiment, a first wire layer 20a and a second wire layer 20b can be made of two different conductive materials, and can be disposed at different times, namely, the first wire layer 20a can be disposed first for contacting with the substrate 10 and the second wire layer 20b can be disposed later for contacting with the substrate 10 or vice-versa.

Particularly, bridge wires 21 are distributed at intervals along a first axis 14 to make the bridge wires 21 get formed as a rectangle distributed pattern on a substrate 10. The peripheral wires 22, on the other hand, are simultaneously disposed on the periphery of the substrate 10 on the basis of the first axis direction 14 and a second axis direction 15.

Figure 7:
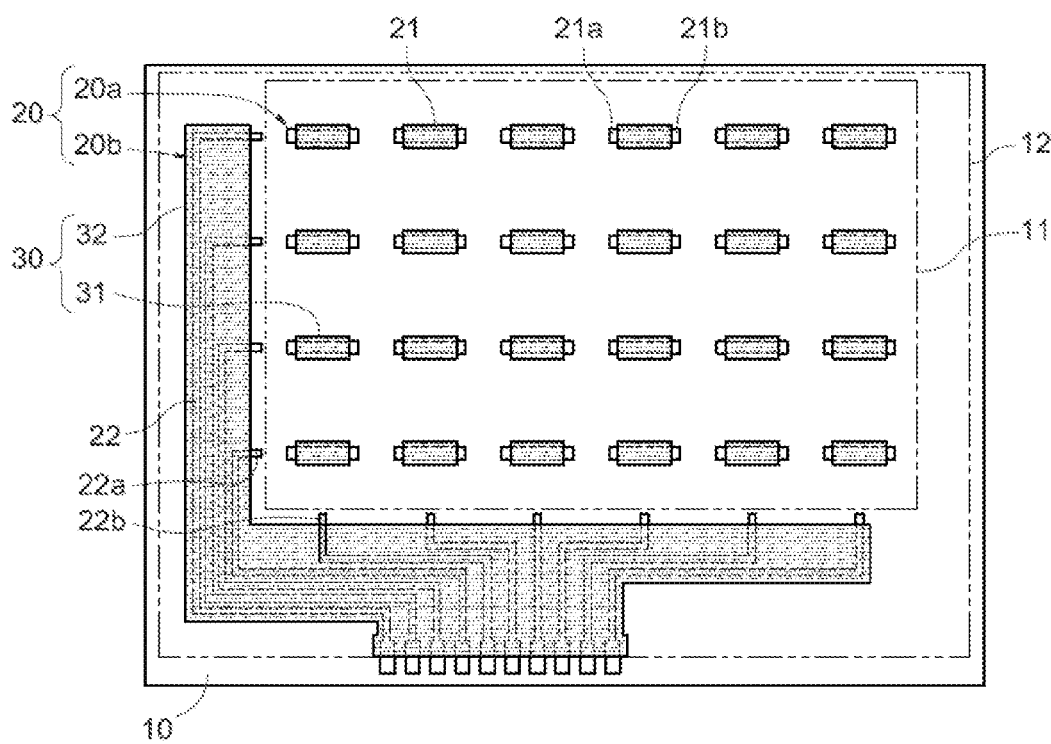

At step S20: Insulating materials characterized with a light transmission and opacity properties are used for making an insulating layer 30 by screen printing process (as shown in FIG. 5b and FIG. 7). The insulating layer 30 partly covers the wire layer 20 to expose the connecting ends 21a, 21b, 22a and 22b of the wire layer 20, so as to make part of the wire layer 20 covered by the insulating layer 30, and other part of the wire layer not covered by the insulating layer 30.

Further, the wire layer 20 that is partly covered by the insulating layer 30, makes both ends of the bridge wire 21 be exposed to the connecting end 21a and 21b. Further, the insulating layer 30, in the touch region 11, is formed as a plurality of insulating bridges 31, wherein the number of insulting bridges 31 is equivalent to the bridge wires 21. Also, the insulting, bridges 31 partly cover middle section of the bridge wires 21 so as to make both ends of the bridge wires 21 exposed to the connecting ends 21a and 21b.

In one embodiment, the insulating layer 30, in the touch region 11 and the peripheral region 12 is disposed at the same time. Apart from forming the insulating bridge 31 in the touch region 11 for partly covering the middle section of the bridge wires 21 while exposing the connecting ends 21a and 21b, an insulating frame 32 is also formed in the peripheral region 12 for covering area of the peripheral wires 22, but not covering the connecting ends 22a and 22b adjacent to touch region 11 of the peripheral wires 22.

At step S30: indium tin oxide is elected as a material for low-temperature sputtering. A sensing layer 40 is formed by low-temperature sputtering at 30° C. to 40° C. and solvent or lacer etching after Step S20. As shown in FIG. 5c and FIG. 8, the sensing layer 40 is formed on the insulating layer 30 of the touch region 11 and is electrically connected with the connecting ends 21a, 21b, 22a, and 22h of the wire layer 20. While forming sensing electrode layer 40, the insulating frame 32 can prevent the peripheral wires 22 from corrosion by etching indium tin oxide.

In an embodiment, the sensing electrode layer 40 comprises of a plurality of separate electrodes 41, a plurality of connecting lines 43, and a plurality of connecting electrodes 42 that are connected with the connecting lines 43. Two adjacent separate electrodes 41 can be connected to each other by a bridge wire 21 between them and respectively overlap connecting end 21a and connecting end 21b of the bridge wire 21. The number of connecting lines 43 is equivalent to the number of insulating bridges 31, wherein the connecting lines 43 cross the insulating bridges 31. Connecting electrodes 42 are separately and electrically connected with corresponding connecting lines 43, wherein the separate electrodes 41 and the connecting electrodes 42 that are adjacent to the peripheral wires 22, are separately connected with the connecting ends 22a and 22b of the peripheral wires 22, so as to form the reticulated sensing electrode layer 40.

Furthermore, referring to FIG. 8, the schematic view illustrates an implementation method of a touch panel that shows a separate electrode 41 and a connecting electrode 42 separately connected with the peripheral wires 22. A connecting area 13 is defined by an area between the peripheral wires 22 and the touch region 11. Separate electrodes 41 and the connecting electrodes 42 extend to the connecting area 13 while disposing the sensing electrode layer 40 so as to separately form a first connecting section 23 and a second connecting section 24, and also to electrically connect with the peripheral wires 22 of the peripheral region 12 through the first connecting section 23 and second connecting section 24. More particularly, the first and second connecting sections 23 and 24 are separately and electrically connected with the connecting ends 22a and 22b of the peripheral wires 22 so as to make the sensing electrode layer 40 connected with an external soft control circuit through the peripheral wires 22.

In addition, the separate electrodes 41 are distributed along a first axis direction 14 and the connecting electrodes 42 are distributed along a second axis direction 15. Peripheral wire 22 transfers a touch potential signal that is generated by the sensing electrode layer 40 to the external soft control circuit through an external terminal 22c, so that the external soft control circuit is able to further detect and calculate the touch position on the basis of a touch potential signal.

At step S40, as shown in FIG. 5d to FIG. 9, a protective layer 50 is disposed with a transparent or opaque insulating material by screen printing. The protective layer 50 at least covers and is in direct contact with the sensing layer 40 without any other element between them.

Further, the protective layer 50 can also cover the peripheral region 12 and other areas in the touch region 11 that are not covered by the sensing electrode layer 40. Namely, a protective layer 50 in the touch region 11 and in the peripheral region 12 is disposed simultaneously, so as to cover the sensing electrode layer in the touch region 11, the peripheral region 12, and other areas in the touch region that are not covered by the sensing electrode layer 40. In one embodiment, other areas include the surface of substrate 10 with any stack-up on it and are not limited to same layer height.

In an embodiment, area of peripheral wires 22 can be covered by an insulating frame 32 after the step S20. Therefore, while disposing protective layer 50 at step S40, the insulating frame 32 can also be covered by the protective layer 50, wherein the insulating layer 32 is simultaneously protected by the protective layer 50.

At step S50: baking sensing electrode layer 40 and protective layer 50 simultaneously at high-temperature for approximately 240° C. to cure the sensing electrode layer 40 and the protective layer 50.

In one embodiment, on the basis of the manufacturing method that is disclosed by the step S10, to S50, the technical solution of simultaneously baking the sensing electrode layer 40 and the protective layer 50 to manufacture a touch panel is practically applicable. Particularly when baking at approximately 240° C., the protective layer 50 can prevent the sensing electrode layer 40, wire layer 20, insulating bridge 31, and insulating frame 32 from being heat shocked or heat persecuted. In particular, due to the presence of oxygen in the baking environment, the protective layer 50 can isolate the sensing electrode layer 40 from contacting the oxygen so as to prevent the sensing electrode layer from being oxidized during baking process, thereby avoiding variation of resistance value of the sensing electrode layer 40, and maintaining accuracy of touch detection. Moreover, with the sensing electrode layer 40 and the protective layer 50 being baked at the same time, one baking process is reduced when compared with conventional manufacturing processes, in which the sensing electrode layer 40 and the protective layer 50 are baked at different times. The present disclosure thus simplifies the manufacturing process.

In one embodiment of the present disclosure, by way of the step S10 to S50, a touch panel with a multi-layer structure can be made. (as shown in FIG. 5d and FIG. 9). The touch panel comprises the sensing electrode layer 40 and the protective layer 50, wherein the protective layer 50 covers the sensing electrode layer 40, further wherein the protective layer 50 directly contacts the sensing electrode layer 40 and there is no other component layer between them.

In another embodiment of the current disclosure, referring to FIG. 10 and FIG. 11, disposing of a wire layer is explained. In the step S10 of present disclosure, bridge wires 21, peripheral wires 22, and external terminals 22c are formed simultaneously. However, in the FIG. 10 of the present embodiment, the bridge wires 21, the external terminals 22c, the first connecting elements 25, and the second connecting elements 26, inside the connecting area 13, are formed simultaneously. Peripheral wires 22 are then formed, making two ends of the first connecting elements 25 respectively and electrically connected to the peripheral wires 22 of peripheral region and to the separate electrodes 41, wherein the separate electrodes 41 are formed by the sensing electrode layer 40. The second connecting elements 26 are then electrically connected to the peripheral wires 22 of peripheral region and to the connecting electrodes 42 respectively, wherein the connecting electrodes 42 are formed by the sensing electrode layer 40. The external terminals 22e are then electrically connected with peripheral wires 22. As shown in FIG. 11, the sensing electrode layer 40 is connected to the external soft control circuit through the peripheral wires 22 and the terminals 22c.

In one embodiment, order of disposition of wire layer is not limited to the present disclosure. First connecting elements, second connecting elements, bridge wires, and peripheral wires can be disposed at the same time.

Particularly, touch panel of the present disclosure comprises a wire layer 20, an insulating layer 30, a sensing electrode layer 40, and a protective layer 50. The wire layer 20 is formed in a touch region 11 and a peripheral region 12 of a substrate 10. The insulating layer 30 partly covers the wire layer 20 to expose connecting ends 21a, 21b, 22a, and 22b of the wire layer 20. The sensing electrode layer 40 is formed on the insulating layer 30 of the touch region 11 and is electrically connected with the connecting ends 21a, 21b, 22a, and 22b of the wire layer 30. The protective layer 50 at least covers the sensing electrode layer 40. Further, the protective layer 50 also covers the peripheral region 12 and other areas in the touch region that are not covered by sensing electrode layer 40.

Further, the wire layer 20 comprises of a first wire layer 20a and a second wire layer 20b. The first wire layer 20a comprises of a plurality of bridge wires 21 formed in the touch region 11, and the second wire layer 20b comprises of a plurality of peripheral wires 22 in the peripheral region 12. Furthermore, the first and second wire layer 20a and 20b are made of transparent indium tin oxide or opaque metal material with high temperature resistance (such as silver etc.).

Further, the insulating layer 30 comprises of a plurality of insulating bridges 31 and insulating frame 32. The insulating bridges 31 cover middle section of bridge wire 21, and the insulating frame 32 covers the area of the peripheral wire 22. This area comprises of the surface between two adjacent peripheral wires 22 of substrate, and the surface of peripheral wires 20 in the peripheral region 12. Insulating frame 32 can isolate the peripheral wires 22 from getting in contact with external oxygen, and can also prevent the peripheral wires 22 from getting, corroded by an etchant that is used for forming pattern of the sensing electrode layer 40. Moreover, the insulating layer 30 is made of a transparent or an opaque insulating material.

Further, the sensing electrode layer 40 comprises of a plurality of the separate electrodes 41, connecting lines 43, and connecting electrodes 42, wherein, every two adjacent separate electrodes 41 are electrically connected to each other by the bridge wire 21 between them, with overlap at ends 21a and 21b of the bridge wire 21, and the connecting lines 43 cross the insulating bridges 31 and therefore are integrally formed with the connecting electrodes 42.

In one embodiment, referring to FIG. 8, the method illustrates a connection means between separate electrodes 41, connecting electrodes 42, and peripheral wires 22. A touch area 13 is formed by a region between the peripheral wires 22 and the touch region, where the separate electrodes 41 and connecting electrodes 42 extend so as to form a first connecting section 23 and a second connecting section 24 for electrically connecting the peripheral wires 22 in the peripheral region.

Besides, the separate electrodes 41, connecting electrodes 42, and the peripheral wires 22 can also be connected by other means. For instance, referring to FIG. 11, first connecting elements 25 and second connecting elements 26 are formed on the connecting area 13, and thus, separately and electrically connected to the separate electrodes 41, the connecting electrodes 42, and to the peripheral wires 22.

Further, the protective layer 50 covers the sensing electrode layer 40 through direct contact with each other, so as to prevent the sensing electrode layer 40 from being oxidized through contact with air, which can improve the accuracy of detection for touch position.

While the present disclosure has been described in connection with certain embodiments, it is to be understood that the disclosure is not limited to the disclosed embodiments, but, on the contrary, is intended to cover various modifications and equivalent arrangements included within the spirit and scope of the appended claims, and equivalent thereof.

What is claimed is:

1. A method for manufacturing a touch panel, comprising:
    providing a substrate having thereon a touch region and a peripheral region;
    disposing an array of bridge wires in the touch region, wherein the array of bridge wires are in direct contact with the substrate;
    after disposing said array of bridge wires, disposing an insulating layer to partly cover the bridge wires thereby exposing two connecting ends of each of the bridge wires;
    disposing an uncured sensing electrode layer comprising a plurality of uncured separate electrodes and a plurality of uncured connecting lines, wherein the two adjacent separate electrodes are separately and electrically connected to one of two connecting ends d each: of the bridge wires;
    disposing an uncured protective layer to cover said uncured sensing electrode layer, wherein no curing or baking process is performed after disposing the uncured sensing electrode layer and before disposing the uncured protective layer; and
    performing a baking process to simultaneously bake the uncured connecting lines and said uncured separate electrodes and the uncured protective layer, wherein the uncured protective layer, the uncured connecting lines and the uncured separate electrodes are all baked for the first time by performing the baking process and all cured after the baking process.

2. The method for manufacturing the touch panel as claimed in claim 1, wherein said protective layer further covers said peripheral region and covers a surface area that is not covered by said sensing electrode layer.

3. The method for manufacturing the touch panel as claimed in claim 1, wherein said bridge wires and said peripheral wires are made of indium tin oxide or opaque metal.

4. The method for manufacturing the touch panel in claim 1, wherein disposing an uncured sensing electrode layer further comprises:
    sputtering the uncured sensing electrode layer at low temperature.

5. The method for manufacturing the touch panel in claim 1, wherein disposing an uncured sensing electrode layer further comprises:
    sputtering the uncured sensing electrode layer at temperature ranged between about 30° C. to about 40° C.

6. The method for manufacturing the touch panel in claim 1, wherein performing a baking process to simultaneously bake the uncured connecting lines and said uncured separate electrodes and the uncured protective layer further comprises:
    baking the uncured connecting lines and said uncured separate electrodes and the uncured protective layer at about 240° C.

7. The method for manufacturing the touch panel as claimed in claim 1, further comprising:
    disposing a plurality of peripheral wires in the peripheral region of the substrate.

8. The method for manufacturing the touch panel as claimed in claim 7, further comprising:
    simultaneously disposing the array of bridge wires in said touch region and the plurality of peripheral wires in said peripheral region.

9. The method for manufacturing the touch panel as claimed in claim 1, wherein each of said bridge wires in the touch region has a stripe shaped pattern with its lengthwise direction being in parallel with a first direction.

10. The method for manufacturing the touch panel as claimed in claim 9, wherein the insulating layer forms a plurality of insulating bridges, wherein each of said insulating bridges covers a middle section of each of said bridge wires so that two connecting ends of each of said bridge wires are exposed, further wherein the insulating layer forms an insulating frame to cover distributed surface area of said peripheral wires.

11. The method for manufacturing the touch panel as claimed in claim 10, wherein said insulating layer is made of a transparent or opaque insulating material.

12. The method for manufacturing the touch panel as claimed in claim 9, wherein the plurality of connecting lines are formed on said insulating layer and disposed across the insulating bridges, wherein said connecting lines extend along a second direction that is perpendicular to the first direction; and wherein the sensing electrode layer further comprises:
    a plurality of connecting electrodes electrically connected with said connecting lines, wherein the separate electrodes and the connecting electrodes are adjacent to said peripheral wires and are each separately connected with one connecting end of a separate one of said peripheral wires.

13. The method for manufacturing the touch panel as claimed in claim 12, wherein a connecting area is defined by an area between said peripheral wires and said touch region, further wherein said separate electrodes and said connecting electrodes extend to the connecting area to form a first connecting section and a second connecting section for electrically connecting with said peripheral wires of peripheral region.

14. The method for manufacturing the touch panel as claimed in claim 12, wherein a connecting area is defined by an area between said peripheral wires and said touch region, further wherein first connecting elements and second connecting elements are formed on the connecting area, further wherein the first connecting elements and the second connecting elements are respectively and electrically connected to the separate electrodes and connecting electrodes.

15. The method for manufacturing the touch panel as claimed in claim 14, wherein before disposing the plurality of peripheral wires in the peripheral region of the substrate, the method further comprising:
simultaneously disposing an array of bridge wires in said touch region and the first connecting element and second connecting elements in said connecting area.

16. A method for manufacturing a touch panel, comprising:
providing a substrate having thereon a touch region and a peripheral region;
disposing an array of bridge wires in the touch region, wherein the array of bridge wires are in direct contact with the substrate;
after disposing said array of bridge wires, disposing an insulating layer to partly cover the bridge wires thereby exposing two connecting ends of each of the bridge wires;
disposing an uncured sensing electrode layer comprising a plurality of uncured connecting lines and a plurality of uncured separate electrodes, the uncured connecting lines formed on the insulating layer, wherein the two adjacent separate electrodes respectively overlap two connecting ends of one of the bridge wires so as to allow the two adjacent separate electrodes to be electrically connected to each other by the bridge wire therebetween;
disposing an uncured protective layer to cover said uncured sensing electrode layer, wherein no curing or baking process is performed after disposing the uncured sensing electrode layer and before disposing the uncured protective layer; and
performing a baking process to simultaneously bake the uncured connecting lines, the uncured separate electrodes and the uncured protective layer, wherein the uncured connecting lines, the uncured separate electrodes and the uncured protective layer are all cured for the first time by performing the baking process and all cured after the baking process.

17. The method for manufacturing a touch panel as claimed in claim 16, wherein no curing or baking process is performed after the insulating layer is disposed and before disposing the uncured protective layer.

* * * * *